(12) United States Patent
Fontanes, II et al.

(10) Patent No.: US 6,851,253 B2
(45) Date of Patent: Feb. 8, 2005

(54) ON-BOARD VEHICLE JACKING APPARATUS AND METHODS OF USING SAME

(75) Inventors: Arturo L. Fontanes, II, Lutz, FL (US); Randall A. Beihoffer, Isle, MN (US); Edric C. Funk, Blaine, MN (US)

(73) Assignee: The Toro Company, Bloomington, MN (US)

( * ) Notice: Subject to any disclaimer, the term of this patent is extended or adjusted under 35 U.S.C. 154(b) by 125 days.

(21) Appl. No.: 10/253,107

(22) Filed: Sep. 24, 2002

(65) Prior Publication Data

US 2003/0019199 A1 Jan. 30, 2003

Related U.S. Application Data

(62) Division of application No. 09/843,360, filed on Apr. 25, 2001, now Pat. No. 6,701,699.

(51) Int. Cl.[7] .............................................. A01D 67/00
(52) U.S. Cl. ...................................................... 56/16.7
(58) Field of Search ................................ 56/15.8, 16.7, 56/17.1, 15.9, 17.2, 15.7; 16/35 R; 280/48.13, 287; 180/208, 216

(56) References Cited

U.S. PATENT DOCUMENTS

| | | |
|---|---|---|
| 1,213,994 A | 1/1917 | Anderson |
| 1,268,101 A | 6/1918 | Drew |
| 1,955,649 A | 4/1934 | Nuccio |
| 2,012,554 A | 8/1935 | Travis |
| 2,108,888 A | 2/1938 | Gunter |
| 2,240,430 A | 4/1941 | Willard |
| 3,477,734 A | 11/1969 | Albertson |
| 3,733,051 A | 5/1973 | Bollinger |
| 3,744,757 A | 7/1973 | White et al. |
| 3,779,517 A | 12/1973 | Fischer |
| 4,277,050 A | 7/1981 | Mostert |
| 4,469,348 A | 9/1984 | Crook |
| 4,549,721 A | 10/1985 | Stone |
| 4,770,440 A | 9/1988 | Lander |
| 4,779,406 A | 10/1988 | Schroeder |
| 4,829,754 A | 5/1989 | Shimamura et al. |
| 4,897,013 A | 1/1990 | Thompson et al. |
| 4,958,804 A | 9/1990 | Lenius et al. |

(List continued on next page.)

OTHER PUBLICATIONS

Country Clipper, "The Commercial "04" Model," Corydon, IA [retrieved on Aug. 20, 2001], Retrieved from the Internet: <URL:http://countryclipper.com/04/04.htm>; 3 pgs.

Carswell Distributing Co., "Jungle Jim's Product Line," Winston–Salem, NC [retrieved on Aug. 20, 2001]. Retrieved from the Internet: <URL:http://carswelldist.com/manufact-junglejm.htm>; 2 pgs.

*Primary Examiner*—Robert E Pezzuto
(74) *Attorney, Agent, or Firm*—Mueting, Raasch, & Gebhardt, P.A.

(57) ABSTRACT

Jacking apparatus for use with ground maintenance vehicles and methods of using such apparatus are provided. In general, the jacking apparatus includes a jacking member which may pivotally couple to the frame of the vehicle. The jacking member is preferably positionable in a stored position, a jacking position, or a jacked position wherein the stored and jacking positions correspond to the vehicle being in an operating configuration while the jacked position corresponds to the vehicle being in an elevated, maintenance configuration. During operation, the driving power of the vehicle may be used to propel the vehicle up and onto the jacking member, thereby elevating a first portion of the vehicle relative to a second portion. Preferably, the apparatus further includes a latching device to permit latching of the jacking member in both the stored position and the jacked position.

18 Claims, 10 Drawing Sheets

U.S. PATENT DOCUMENTS

| | | |
|---|---|---|
| 5,000,423 A | 3/1991 | Snickers |
| 5,079,907 A | 1/1992 | Sameshima et al. |
| 5,096,171 A | 3/1992 | Kendrick et al. |
| 5,228,651 A | 7/1993 | Warner |
| 5,324,005 A | 6/1994 | Beattie et al. |
| 5,421,611 A | 6/1995 | Peterson et al. |
| 5,475,971 A | 12/1995 | Good et al. |
| 5,515,669 A | 5/1996 | Schick et al. |
| 5,678,804 A | 10/1997 | Lintelman et al. |
| 5,702,089 A | 12/1997 | Hurd |
| 5,816,035 A | 10/1998 | Schick |
| 5,826,857 A | 10/1998 | Brack et al. |
| 5,971,360 A | 10/1999 | Sinsley |
| 6,053,477 A | 4/2000 | Price |
| 6,330,997 B2 | 12/2001 | McGlaun et al. |
| 6,434,919 B2 | 8/2002 | Schick |
| 6,516,597 B1 | 2/2003 | Samejima et al. |
| 2002/0157369 A1 | 10/2002 | Fontanes, II et al. |

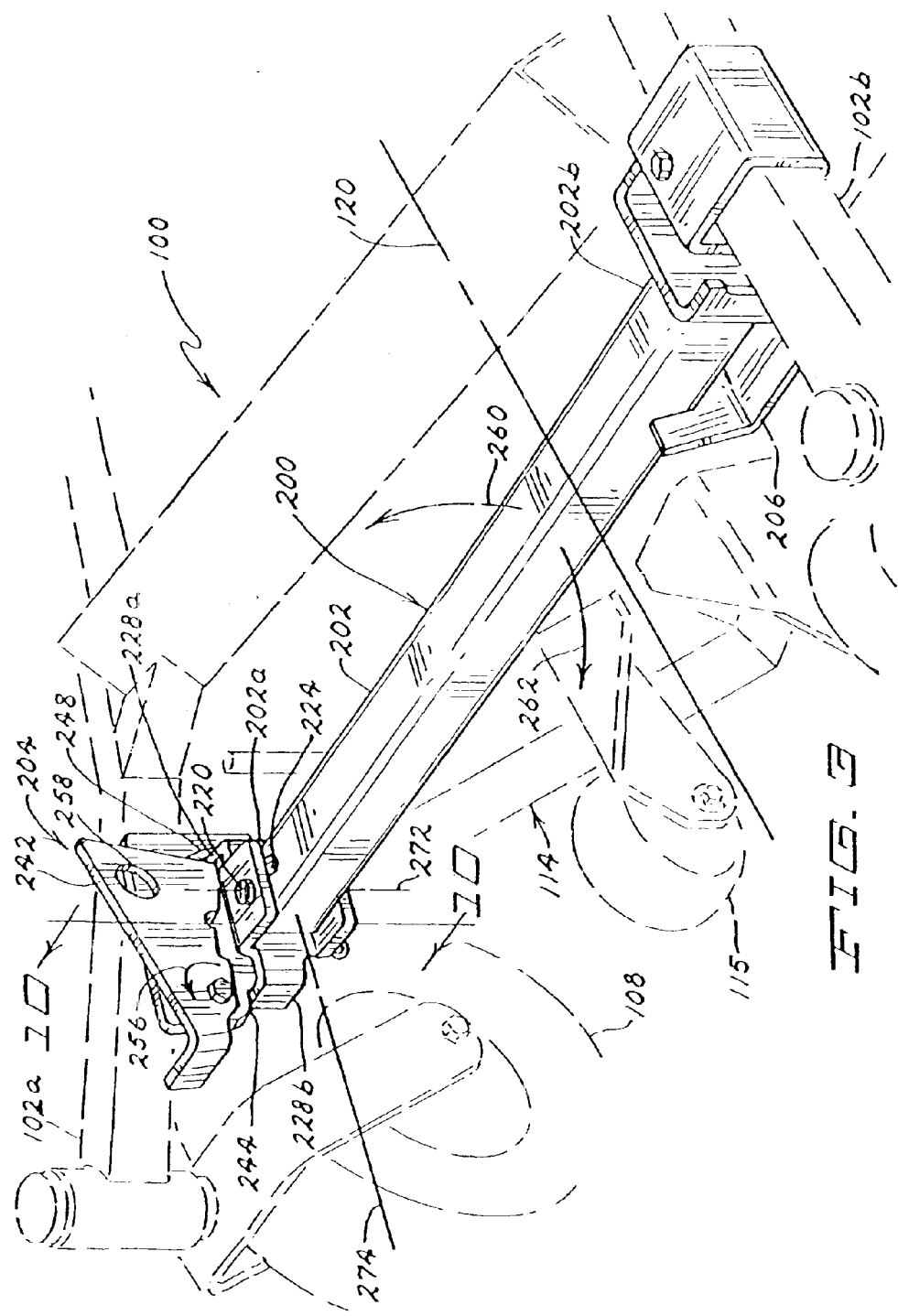

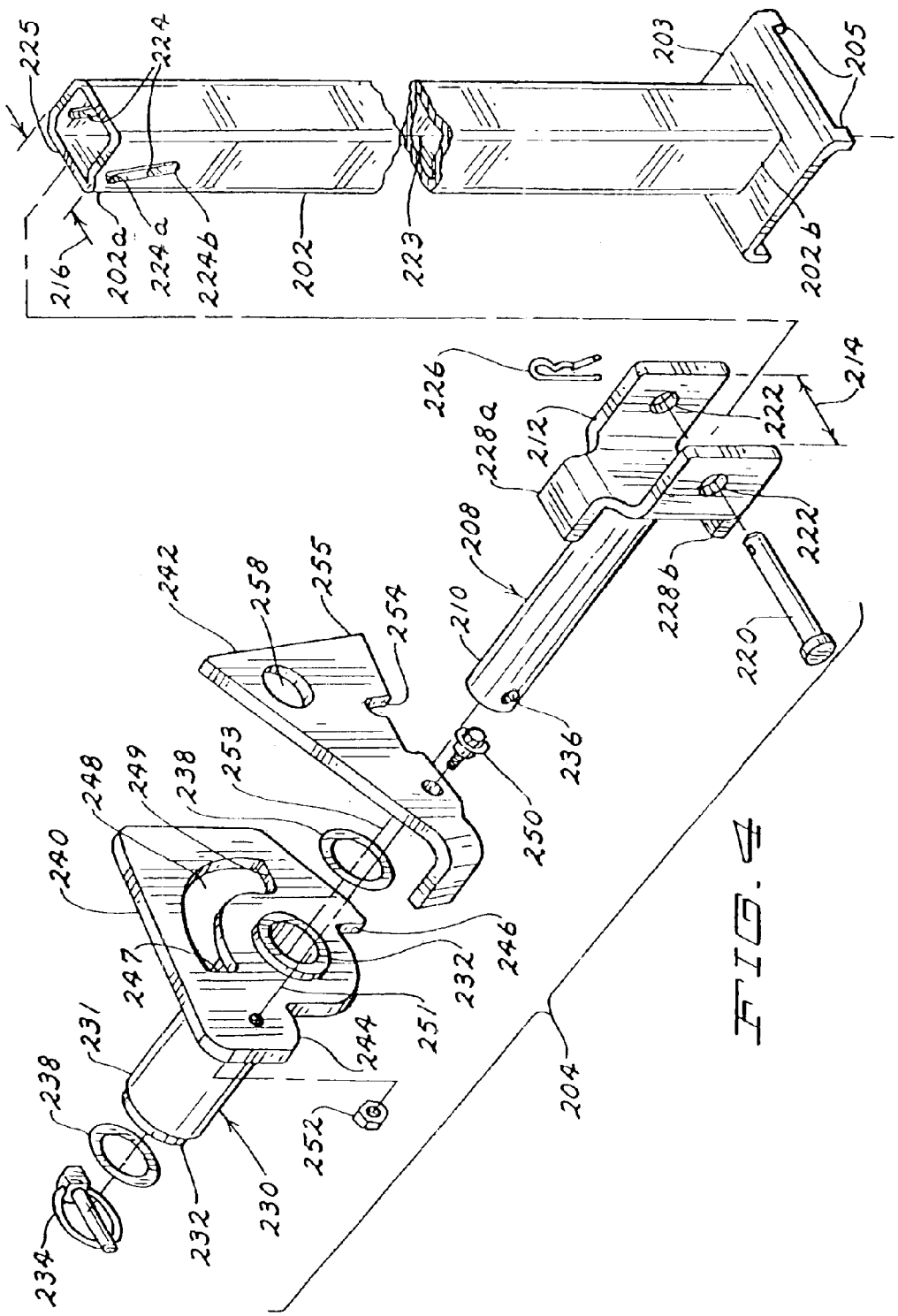

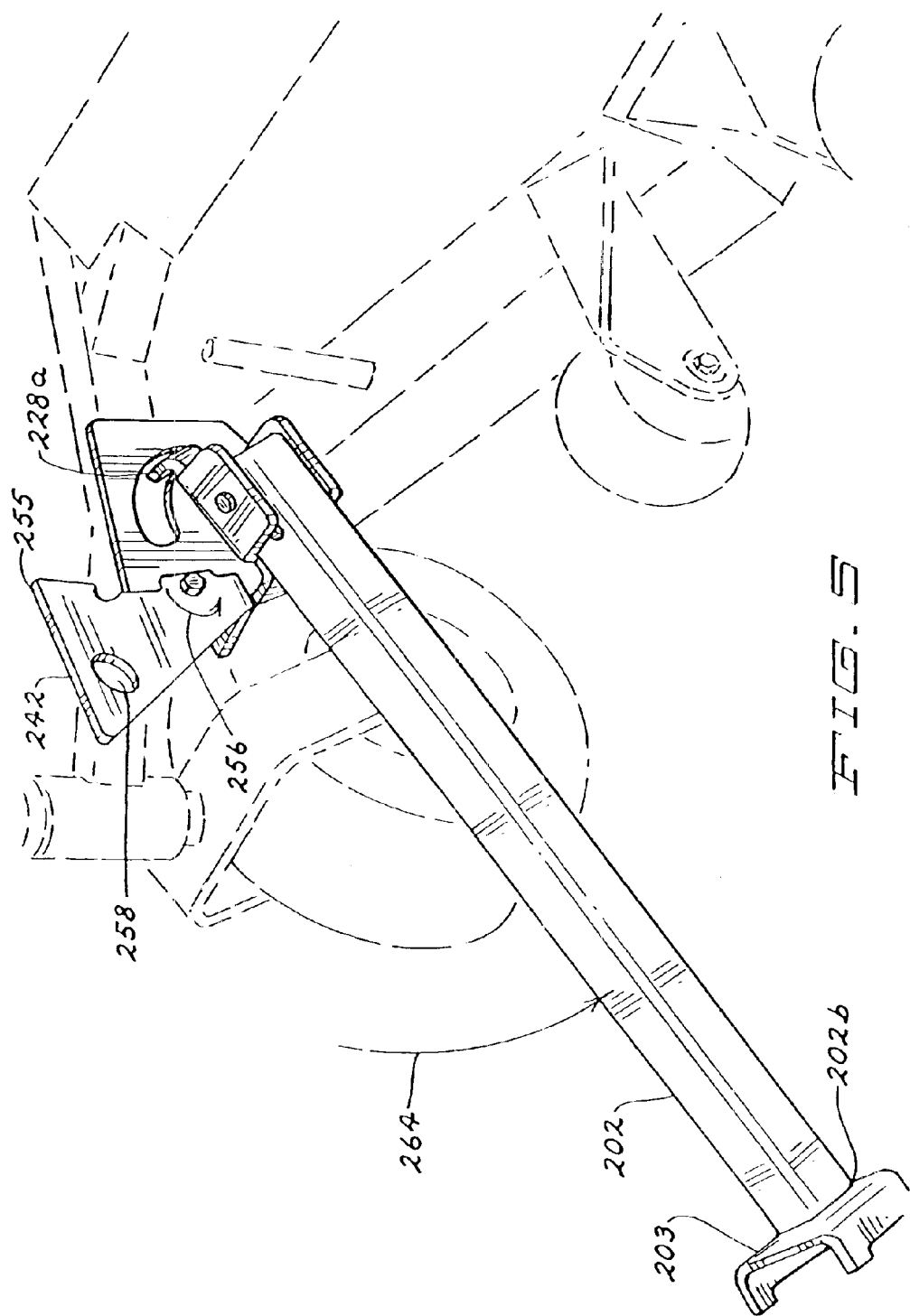

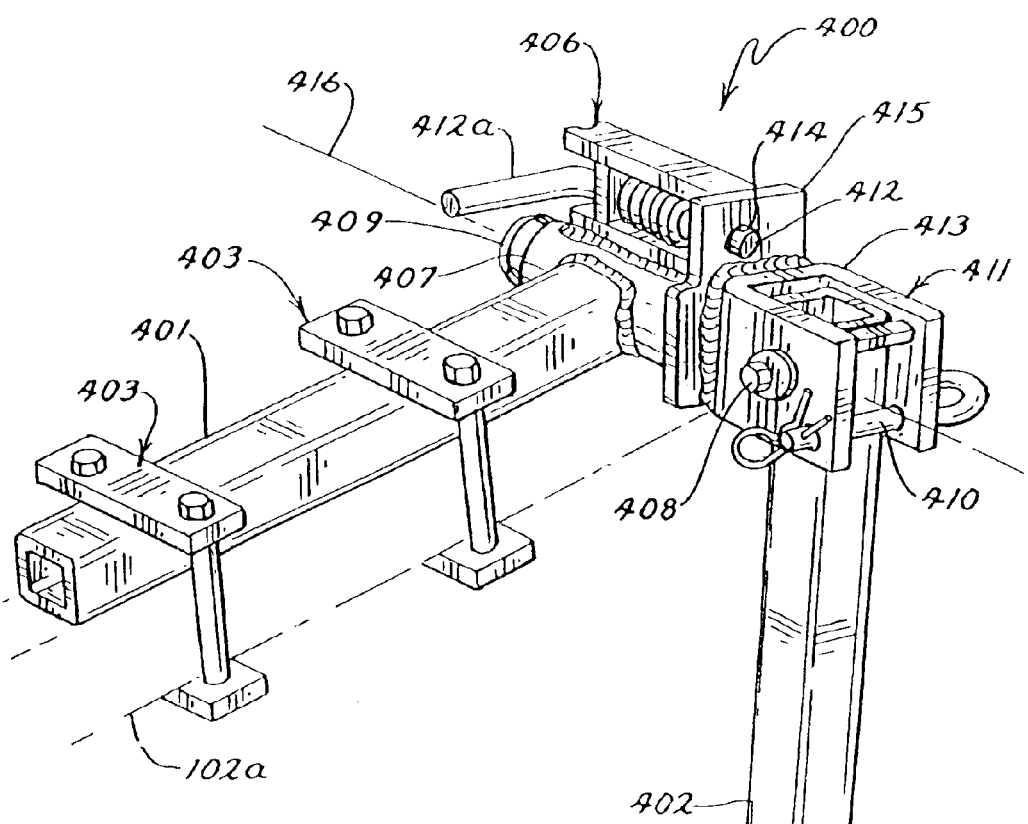
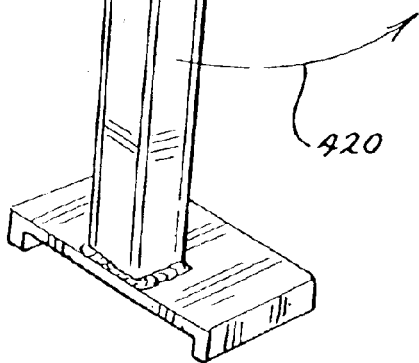

ON-BOARD VEHICLE JACKING APPARATUS AND METHODS OF USING SAME

This a division of application Ser. No. 09/843,360, filed Apr. 25, 2001, now U.S. Pat. No. 6,701,699 which is incorporated herein by reference.

TECHNICAL FIELD

The present invention relates generally to on-board jacking devices and, more particularly, to ground maintenance vehicles such as riding lawn mowers having an integrated jacking apparatus that may be actuated, at least in part, by the propelling motion of the vehicle.

BACKGROUND OF THE INVENTION

Ground maintenance vehicles for performing a variety of tasks are known. For instance, vehicles designed for or having attachments useful for mowing, fertilizing, aerating, dethatching, vacuuming/blowing, and the like are available. While the present invention is applicable to most any ground maintenance vehicle or, for that matter, to most any type of vehicle, it will, for the sake of brevity, be described with respect to riding lawn mowers having a cutting deck with one or more cutting blades associated therewith.

Traditional riding mowers, e.g., those typically having four wheels wherein the front wheels are conventionally steerable, are in common use by homeowners and professionals alike. However, for lawns having numerous obstacles, tight spaces, and/or intricate borders, mowers having zero-radius-turning (ZRT) capability are often preferred. As the name implies, "ZRT" generally indicates a vehicle having a very tight minimum turning radius, i.e., a vehicle that is highly maneuverable.

Most ZRT riding mowers have one or more drive wheels located on transversely opposing sides of a mower frame. These drive wheels may be located either near the front or rear of the vehicle. The drive wheels are independently powered by a vehicle engine so that, while one wheel may rotate in a first direction at a first speed, the other wheel may rotate in the same or different direction at the same or different speed. Rotating one drive wheel for forward motion while simultaneously slowing, stopping, or, more preferably, rotating the other drive wheel for rearward motion, causes the mower to spin generally about its center, e.g., execute a sharp turn. Typically, the mower includes one or more caster wheels in addition to the drive wheels to support the remaining weight of the mower yet not interfere with the mower's ability to execute sharp turns.

While advantageous due to their high degree of maneuverability, ZRTs having large cutting decks are also adept at mowing large, open areas. It is this versatility that makes ZRT mowers particularly popular among professionals such as landscape contractors and commercial grounds maintenance workers.

Because commercial-grade mowers generally operate at relatively high duty cycles (high ratio of operating time to total time), they have correspondingly increased maintenance schedules. For instance, changing of the cutting blades and cleaning of the cutting deck are performed more frequently (e.g., sometimes once a day or more) to ensure that optimal cutting efficiency is maintained. Accordingly, mowers that provide convenient access to the underside of the cutting deck are advantageous.

Some mowers that provide such convenient access are those having an "outfront" cutting deck geometry. As the name implies, outfront ZRTs position the cutting deck in front of the vehicle to allow the cutting deck to be easily raised, often to a position that is 90 degrees or more from the operating position. This raised position permits generally unimpeded access to the underside of the cutting deck, and thus, the cutting blades. While advantageous, positioning the cutting deck forward of the vehicle typically results in a more complex, longer, and expensive mower.

An alternative to outfront ZRTs, are "mid-mount" mowers. Mid-mount ZRTs position the cutting deck underneath the mower frame, i.e., between the forward, e.g., caster, wheels, and the rear, e.g., drive, wheels, allowing a potentially shorter overall length and less complex deck/vehicle interconnection.

While potentially yielding a less expensive mower, mid-mount ZRTs do not provide the convenient flip-up deck of their outfront counterparts. Accordingly, deck maintenance, e.g., blade replacement and deck cleaning, requires either access via the limited space available between the deck and the ground or, alternatively, external jacking of the mower.

One potential solution to this problem is to utilize an on-board jacking device. Automobiles and trailers having such devices are known (see e.g., U.S. Pat. Nos. 1,955,649 (Nuccio) and 5,702,089 (Hurd)). However, these devices do not address the unique requirements of mowers and other ground maintenance vehicles. For example, the configuration, e.g., relatively low ground clearance, of mowers provides limited space within the vehicle envelope in which to manipulate and store the jacking device when not in use.

Apparatus and methods for use with a ground maintenance vehicle, e.g., a mower, that address these and other problems would therefore be desirable.

SUMMARY OF THE INVENTION

On-board jacking apparatus and methods for use with ground maintenance vehicles such as walk-behind and riding mowers are provided. In use, apparatus and methods in accordance with the present invention provide access to the underside of the mower deck without the need for separate, external equipment, e.g., jacks. Furthermore, the apparatus stows efficiently without protruding beyond the general periphery of the mower. Moreover, the apparatus operates without interfering with the normal operation of the mower and furthermore without interfering with operator ingress and egress.

In one embodiment, a self-propelled lawn mowing apparatus is provided including at least one drive wheel rotatably coupled to a first portion of a mower frame. A cutting deck operatively coupled to an underside of the mower frame and a prime mover adapted to power one or more of the at least one drive wheel and the cutting deck may also be provided. The lawn mowing apparatus further includes an on-board, drive-actuated jacking apparatus where the jacking apparatus has a jacking member having a first end and a second end. The first end is pivotally coupled to the lawn mowing apparatus and the second end is selectively engageable with a ground surface such that a first end of the mowing apparatus may be elevated relative to a second end of the mowing apparatus by engaging the second end of the jacking member with the ground surface and propelling the mowing apparatus in a first direction with the at least one drive wheel, whereby the lawn mowing apparatus drives up and onto the jacking member.

In another embodiment of the present invention, an on-board jacking apparatus for use with a self-propelled vehicle is provided. The apparatus may include a pivot assembly adapted to couple to the vehicle, where the pivot assembly includes a first pivot having a first pivot axis. The apparatus further includes a jacking member having a first end and a second end, where the first end is adapted to couple to the pivot assembly for pivoting of the jacking member about the first pivot axis, and further wherein the jacking member is movable between at least a stored position, corresponding to an operating configuration of the vehicle, and a jacked position, corresponding to an elevated maintenance configuration of the vehicle. The apparatus further includes a second pivot associated with the pivot assembly, wherein the second pivot has a second pivot axis proximate the first end of the jacking member, the second pivot axis being substantially perpendicular to the first pivot axis.

In still another embodiment of the present invention, a vehicle movable between an operating configuration and an elevated maintenance configuration is provided. The vehicle includes one or more ground engaging drive wheels rotatably coupled to a vehicle frame and a prime mover also coupled to the vehicle frame, the prime mover adapted to power the one or more drive wheels. The vehicle also includes a jacking apparatus having: a pivot assembly adapted to couple to the vehicle frame, where the pivot assembly includes a first pivot having a first pivot axis; and a jacking member having a first end and a second end, the first end adapted to couple to the pivot assembly for pivoting of the jacking member about the first pivot axis. The jacking member is movable between at least a stored position corresponding to an operating configuration of the vehicle, and a jacked position corresponding to an elevated maintenance configuration of the vehicle. The jacking apparatus also includes a second pivot associated with the pivot assembly, where the second pivot has a second pivot axis proximate the first end of the jacking member, the second pivot axis being substantially perpendicular to the first pivot axis.

In still yet another embodiment, a method for repositioning a self-propelled, lawn mowing vehicle between an operating configuration and an elevated maintenance configuration is provided. The method includes providing a jacking apparatus having a jacking member, the jacking member having a first end pivotally coupled to a frame of the lawn mowing vehicle at a first pivot. The method further includes moving the jacking member from a stored position to a jacking position, engaging a second end of the jacking member with a ground surface, and propelling the lawn mowing vehicle in a first direction. Propulsion of the lawn mowing vehicle in the first direction results in the vehicle riding up and onto the jacking member towards the elevated maintenance configuration, the elevated maintenance configuration corresponding to a jacked position of the jacking member.

The above summary of the invention is not intended to describe each embodiment or every implementation of the present invention. Rather, a more complete understanding of the invention will become apparent and appreciated by reference to the following detailed description and claims in view of the accompanying drawings.

BRIEF DESCRIPTION OF THE DRAWINGS

The present invention will be further described with reference to the drawings, wherein:

FIG. 3 is an enlarged perspective view of the jacking apparatus of FIG. 1 with the jacking apparatus shown in a stored position;

FIG. 4 is an exploded perspective view of the jacking apparatus of FIG. 1;

FIG. 5 is an enlarged perspective view of the jacking apparatus of FIG. 1 with the jacking apparatus shown in the jacking position;

FIG. 12 is a perspective view of a jacking apparatus in accordance with yet another embodiment of the present invention.

DETAILED DESCRIPTION OF EXEMPLARY EMBODIMENTS

In the following detailed description of the embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Generally speaking, the present invention is directed to a jacking apparatus for use with a self propelled, lawn mowing apparatus or vehicle (also referred to herein as a "mower"). The mower is preferably movable from an operating configuration to a maintenance configuration by engaging the jacking apparatus and propelling the mower in a first direction. Propulsion in the first direction causes the mower to ride up and onto a jacking member of the jacking apparatus, thereby permitting access to one or more portions of the underside of the mower.

Figure 1:
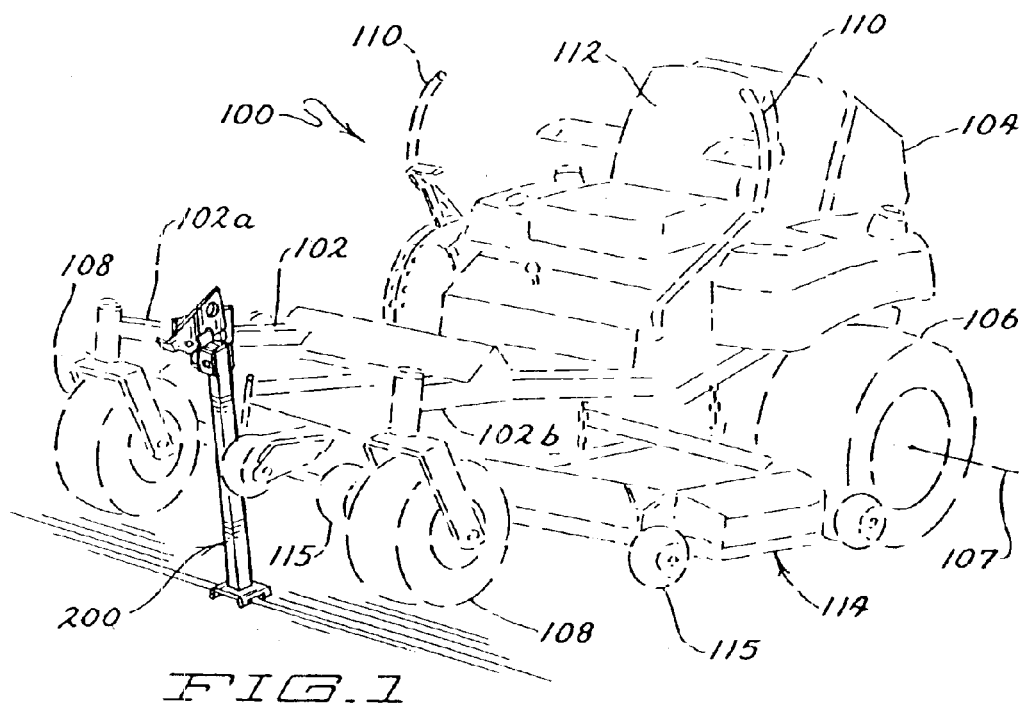
FIG. 1 is a perspective view of a vehicle, e.g., a mower, having an integrated jacking apparatus in accordance with one embodiment of the invention, wherein the jacking apparatus is shown in a jacked position and the mower is shown in a corresponding maintenance configuration.

FIG. 1 shows a jacking apparatus 200 in accordance with one embodiment of the present invention as it may be incorporated on a self-propelled, ground maintenance vehicle, e.g., a mid-mount ZRT mower 100, such as that exemplified by the Z MASTER model Z252L mid-mount mower sold by The Toro Company; Bloomington, Minn. While the invention is herein described with respect to mid-mount, riding mowers, those of skill in the art will realize that it is equally applicable to mowers of most any configuration, e.g., walk-behind mowers, or, for that matter, to most any other ground maintenance vehicle.

While the general mower configuration is not central to the invention, it will now be briefly described. FIG. 1 illustrates the mower 100 having a frame 102 supporting a prime mover, e.g., internal combustion engine 104. A pair of transversely opposing, ground engaging drive wheels 106 (only left wheel shown) may rotatably couple to the rear of the mower 100. The drive wheels 106 may be independently powered by the engine 104 for propelling the mower 100 along a ground surface during operation. Operator controls, e.g., handles 110, permit control of mower speed and direction from an operator station 112. A pair of front swiveling caster wheels 108, connected to forwardly extending frame rails 102a and 102b, may support the front of the mower 100 in rolling engagement with the ground surface.

Although the illustrated mower has the drive wheels 106 in the rear and the caster wheels 108 in front, this configuration is not limiting. For example, other embodiments may reverse the location of the wheels, e.g., drive wheels in front and caster wheels in back. Moreover, other configurations may use different wheel configurations altogether, e.g., a tri-wheel configuration. Accordingly, other embodiments are possible without departing from the scope of the invention.

A cutting deck 114 may be mounted to the lower side of the frame 102 generally between the drive wheels 106 and the caster wheels 108. The cutting deck 114 includes one or more cutting blades (not shown) as known in the art which are operatively powered by the engine 104. During operation, power is selectively delivered to the cutting deck 114, whereby the blades rotate at a speed sufficient to sever grass and other vegetation as the cutting deck 114 passes over the ground surface. Typically, the cutting deck 114 has an operator-selectable height-of-cut device (not shown) to allow adjustment of the cutting deck height. The cutting deck 114 may optionally include deck rollers 115 (also visible in FIG. 3) to assist in supporting the cutting deck 114 relative to the ground surface during operation.

Conventional mid-mount mowers restrict access to the underside of the cutting deck 114 by limiting the space available between the ground surface and the cutting deck 114, a space which is generally minimal even when the deck 114 is raised to its highest position. Accordingly, deck maintenance, e.g., blade replacement, deck cleaning, often requires external jacking of the mower 100.

Mowers in accordance with one or more embodiments of the present invention, however, utilize an on-board, drive-actuated jacking apparatus 200 to permit improved access to the underside of the cutting deck 114 as well as to allow access to other portions of the mower underside without the need for external jacking equipment. "On-board," as used herein, refers to a jacking apparatus 200 that is permanently or semi-permanently attached to the mower 100. "Permanently" or "semi-permanently" refers to attachment of the jacking apparatus 200 in such a way that it is not generally intended to be removed from attachment to the mower 100 by the operator (except possibly for periodic maintenance/repair of the apparatus 200 itself or the surrounding mower structure), even during mower operation.

Figure 2B:
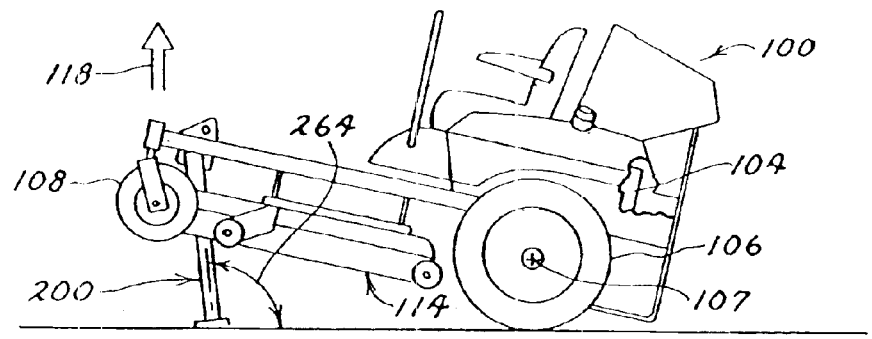
FIG. 2B is a side elevation view of the mower of FIG. 1, wherein the jacking apparatus is shown in the jacked position and the vehicle is shown in the corresponding maintenance configuration.
Figure 2A:
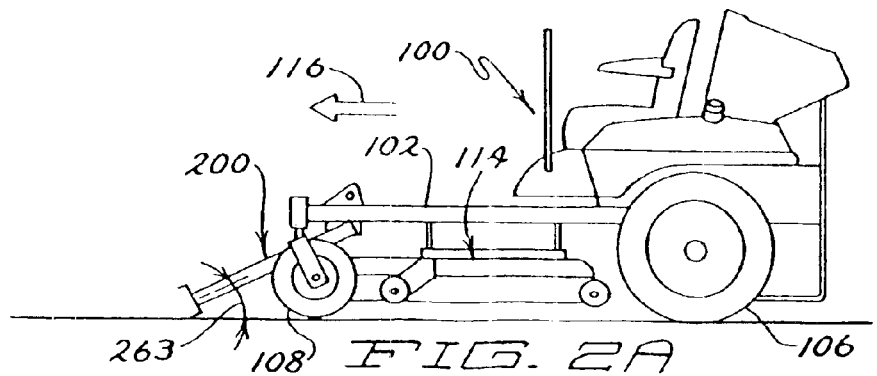
FIG. 2A is a side elevation view of the mower of FIG. 1, wherein the jacking apparatus is shown in a jacking position and the vehicle is shown in a corresponding operating configuration.

An exemplary jacking apparatus 200 in accordance with one embodiment of the present invention is illustrated in FIG. 1. In this embodiment, the jacking apparatus 200 is coupled to the frame 102 and is selectively movable from a stored position (see FIG. 3) to a jacking position (see FIGS. 2A and 5). Once moved to the jacking position, propulsion of the mower 100 in the direction 116 (see FIG. 2A), e.g., forwardly, causes the mower 100 to ride up and onto the jacking apparatus 200 to a jacked position (see FIG. 6), whereby a first or forward portion of the mower 100 is pitched or elevated, i.e., displaced in the direction 118, relative to a second or rear portion as generally shown in FIG. 2B. Stated alternatively, the mower 100 is movable from a first, operating configuration as shown in FIG. 2A, to a second, elevated maintenance configuration as shown in FIG. 2B.

Figure 6:
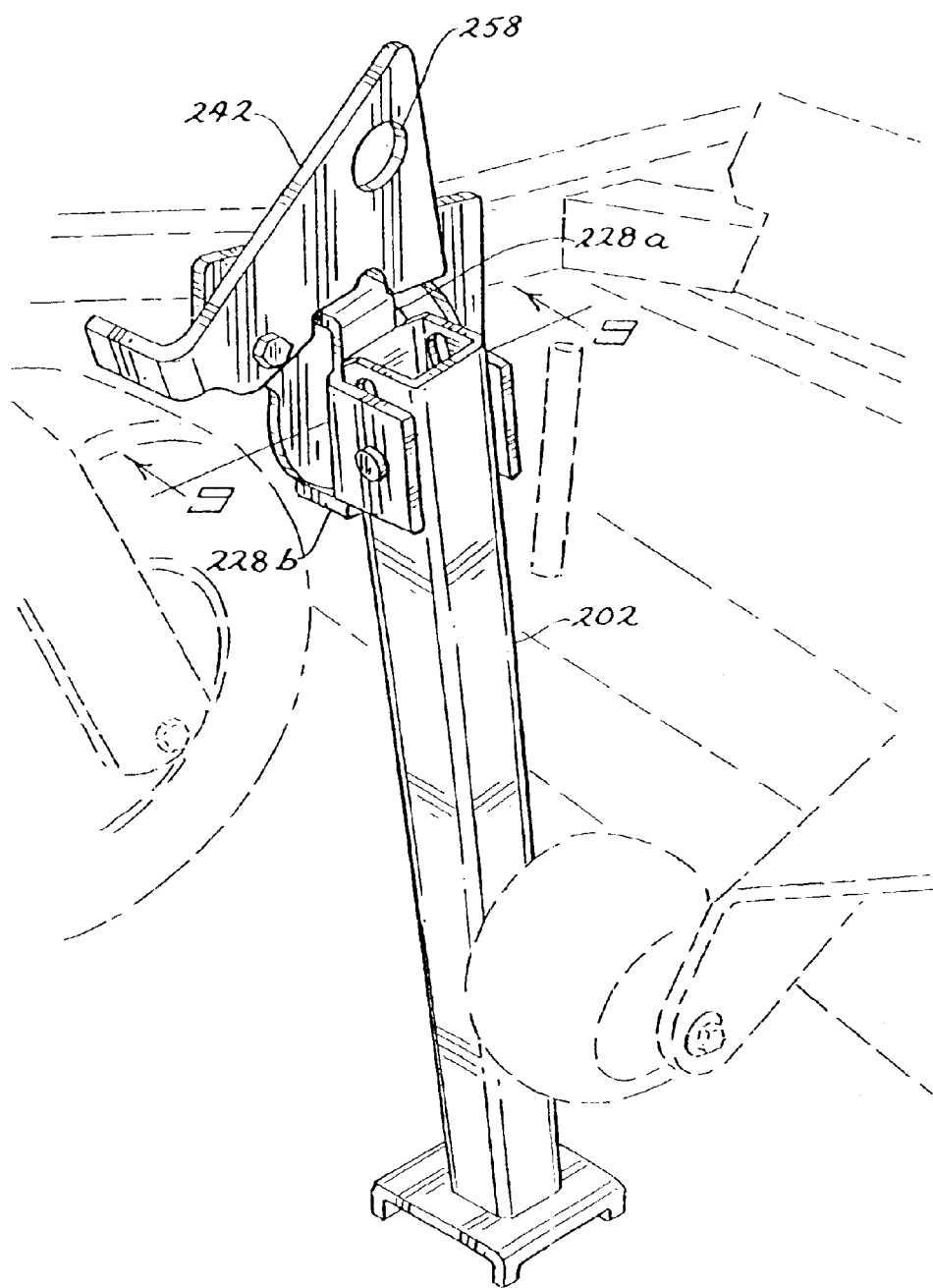
FIG. 6 is an enlarged perspective view of the jacking apparatus of FIG. 1 with the jacking apparatus shown in the jacked position.

For purposes of this discussion, the mower operating configuration (see FIG. 2A) corresponds to the jacking apparatus 200, e.g., the jacking member 202, being in either the stored position (FIG. 3) or the jacking position (FIG. 5), while the vehicle maintenance configuration (see FIG. 2B) corresponds to the jacking apparatus 200, e.g., the jacking member 202, being in the jacked position (FIGS. 1 and 6).

FIG. 3 is an enlarged perspective view of the mower 100 with the jacking apparatus 200 shown in the stored position. While the actual construction of the jacking apparatus 200 may vary, it may, in one embodiment, include a jacking member 202 and a pivot assembly 204. The pivot assembly 204 may allow pivotal coupling of a first end 202a of the jacking member 202 to the mower frame, e.g., at the frame rail 102a.

Figure 11:
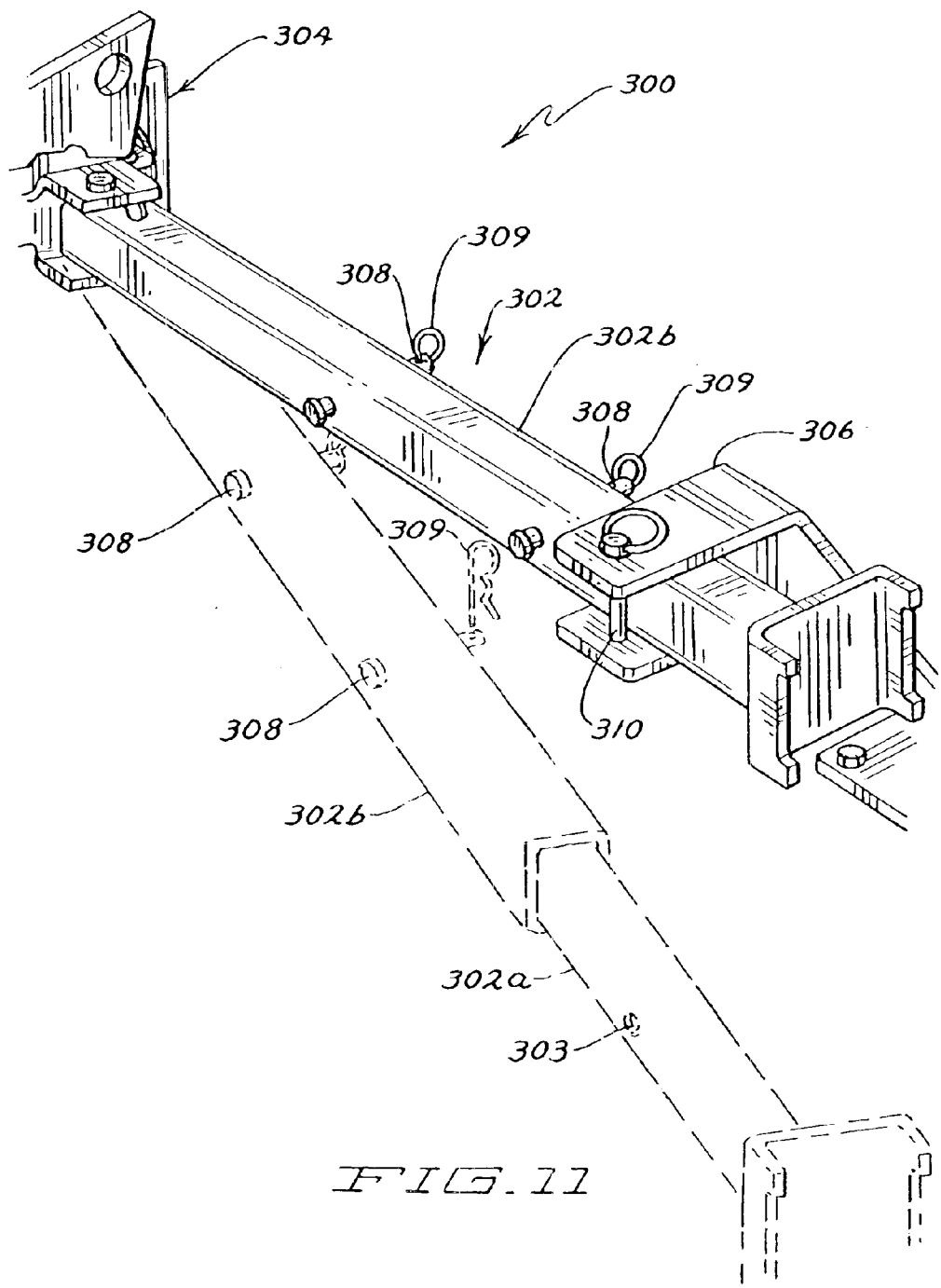
FIG. 11 is a perspective view of a jacking apparatus in accordance with another embodiment of the present invention.

While in the stored position, a second end 202b of the jacking member 202 may optionally be seated in a cradle 206 which, in one embodiment, is coupled to an opposing frame rail 102b. While the cradle 206 is illustrated as a separate, bolt-on or weld-on component in FIG. 3, it may take many forms. For example, the cradle 206 may simply refer to a portion of the frame 102 which is adapted to support the second end 202b. Further, the cradle 206 may be configured as a clevis type device as illustrated in FIG. 11 (see cradle 306).

In the stored position, the jacking apparatus 200, e.g., the jacking member 202, may therefore be generally transverse to a longitudinal axis 120 of the mower 100 (longitudinal axis refers to a symmetrical axis running lengthwise from the front of the mower 100 to the rear while "transverse" is generally used herein to indicate crossing from side-to-side). This transverse storage position is advantageous in that it permits the apparatus 200 to be advantageously mounted near the forward end of the mower 100 without generally extending beyond the mower envelope when stored. Furthermore, transverse storage provides easy operator accessibility to the apparatus 200 while also permitting efficient utilization of available space forward of the cutting deck 114. Apparatus and methods of the present invention, moreover, realize these advantages without interfering with mower operation.

The jacking member 202 is illustrated in FIG. 4. While the exact configuration of the jacking member 202 may vary, it may, in one embodiment, be an elongate and rigid member capable of supporting the jacking loads, e.g., a portion of the weight of the mower 100. For example, the jacking member 202 may be a tubular steel member of rectangular cross-section as shown. However, jacking members made from most any material and having most any cross-sectional shape are certainly possible. Moreover, the jacking member 202 may include multiple sections that interconnect to form a rigid member. For example, multiple sections may couple in a telescoping relationship as further described below.

The terms "first end" and "second end" are used herein merely to identify the effective ends of the jacking member 202. For example, elongate jacking members 202 may be used which extend beyond the pivot assembly 204, e.g., the jacking member 202 may have an extended length such that it couples to the pivot assembly 204 at a more intermediate location along its length. In this instance, the term "end," refers to the effective end, e.g., the point along the jacking member 202 at which it couples to the pivot assembly 204. Moreover, when referring to jacking members having shapes different than the elongate shapes illustrated herein, the term "end" may refer to a similar effective end of the member, e.g., the portion which couples to the pivot assembly 204 or the portion which contacts the ground surface.

As illustrated in FIG. 4, the first end 202a of the member 202 may include a slot 224 formed through opposing walls of the member 202. The slot 224 preferably forms an angle with respect to a longitudinal axis 223 of the jacking member 202 such that a first portion 224a of the slot (the portion adjacent the first end 202a) is proximate a side surface 225 of the member 202 while a second portion of the slot 224b is more centered on a face of the member 202.

The second end 202b of the jacking member 202 is adapted to engage the ground surface during jacking. To assist with load distribution on various turf, the second end 202b may include a foot 203. The foot 203 preferably includes teeth 205 to prevent slipping during operation.

FIG. 4 further illustrates an exemplary pivot assembly 204. The pivot assembly 204 may include a clevis pin assembly 208 having both a cylindrical or pin portion 210 and a clevis portion 212. The pin portion 210 may couple to the clevis portion 212 in any number of ways. For example, the two pieces may be a single machined part. More preferably, they may be separate pieces coupled via known methods, e.g., threadably engaged or welded, the latter being clearly indicated by weld 211 in FIG. 8. The pivot assembly 204 may also include a bearing assembly 230 as further described below.

For purposes which will become clear, the clevis portion 212 preferably includes tabs 228a and 228b (collectively referred to hereinafter as "tabs 228"). The clevis portion 212 also defines a clevis width 214 of sufficient size to receive the jacking member 202 therein, preferably with a minimal clearance fit. A retaining pin 220 may be used to couple the jacking member 202 to the clevis pin assembly 208 by passing through opposing holes 222 of the clevis portion 212 as well as through the slot 224 of the jacking member 202. The slot 224 permits the member 202 to not only pivot about the retaining pin 220, but also to translate relative thereto along the length of the slot. To secure the retaining pin 220 in place, a fastener, e.g., cotter pin 226 or similar fastening device, may be used.

The pin portion 210 of the clevis pin assembly 208 may be coupled, e.g., received within, the bearing assembly 230. The bearing assembly 230 may include a sleeve portion 231 having one or more sleeve bushings 232 therein to support the pin portion 210 during use. Preferably, a distal end of the clevis pin 210 extends beyond the bearing assembly 230 when assembled. As a result, a fastener, such as a cotter pin (not shown) or a linch pin 234, may be used to secure the clevis pin assembly 208 within the bearing assembly 230 via the use of a retainment feature such as a groove (not shown) or hole 236. Other hardware, e.g., thrust washers 238, may also be provided as necessary to improve rotation of the clevis pin assembly 208 within the bearing assembly 230.

When assembled, the pivot assembly 204, e.g., the bearing assembly 230 and clevis pin assembly 208, defines a first pivot having a first pivot axis 253 about which the clevis pin assembly 208, and thus the jacking member 202, may rotate. Preferably, the first pivot axis 253 is generally transverse, e.g., generally perpendicular, to the longitudinal axis 120 (see FIG. 3) of the mower 100. The retaining pin 220 itself may form a second pivot defining a second pivot axis 272 (see FIG. 3) about which the jacking member 202 may rotate. Preferably, the second pivot axis 272 is substantially perpendicular to the first pivot axis 253. While the second pivot axis 272 may intersect the first pivot axis 253, other embodiments may be configured with the two axes offset, e.g., non-intersecting. In the case of the latter, those of skill in the art will realize that two lines in space are perpendicular if they are so after being moved parallel to themselves to a common point of intersection.

Figure 7:
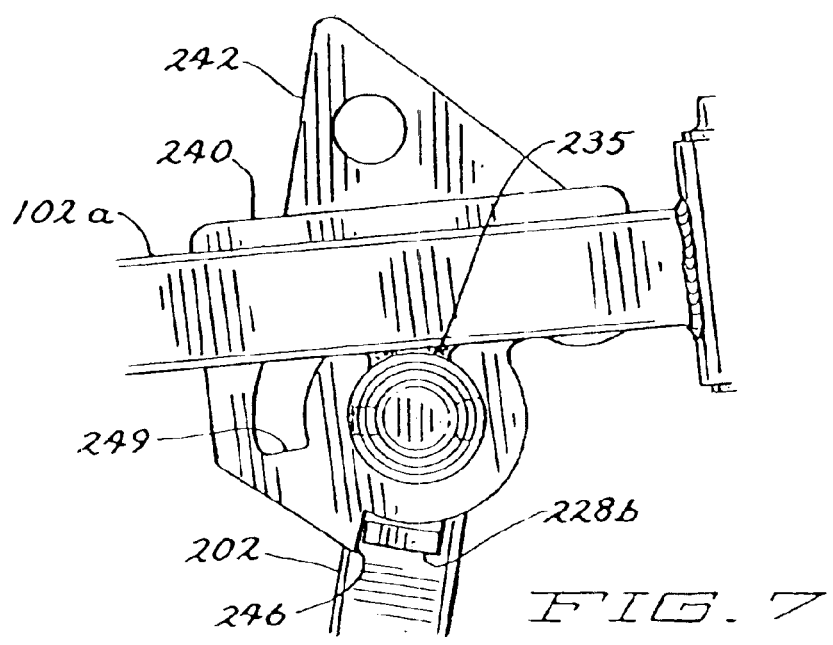
FIG. 7 is an enlarged partial side elevation view of the jacking apparatus of FIG. 6.

The pivot assembly 204 may couple to the frame rail 102a (see FIG. 3) in most any way. For example, it may be welded as represented by weld 235 (clearly illustrated in FIG. 7). Alternatively, other embodiments of the pivot assembly 204 permit bolting to the frame 102 as further described below.

In addition to the bearing assembly 230, the pivot assembly 204 may further include a flange portion 240, best viewed in FIG. 4. The flange portion 240 may be attached to the bearing assembly 230, e.g., at the sleeve portion 231, by known methods such as welding as represented by weld 233 (clearly shown in FIG. 8). Preferably, the flange portion 240 includes features such as tab stops 244 and 246 and tab stops 247 and 249. The tab stops 247 and 249 may be defined by a window 248. The tab stops are provided to, among others, limit the movement of the tabs 228 during operation of the jacking apparatus 200.

FIG. 4 further illustrates a latching device, e.g., latching member 242, which may be pivotally coupled, e.g., fastened with screw 250 and nut 252, to the frame 102, or more preferably, to the pivot assembly 204, e.g., at the flange portion 240, for pivoting about a pivot axis 251. The latching member 242 may include features such as tab lock surfaces 254 and 255 which, as further described below, permit locking of the jacking member 202 in one or more respective positions.

Figure 10:
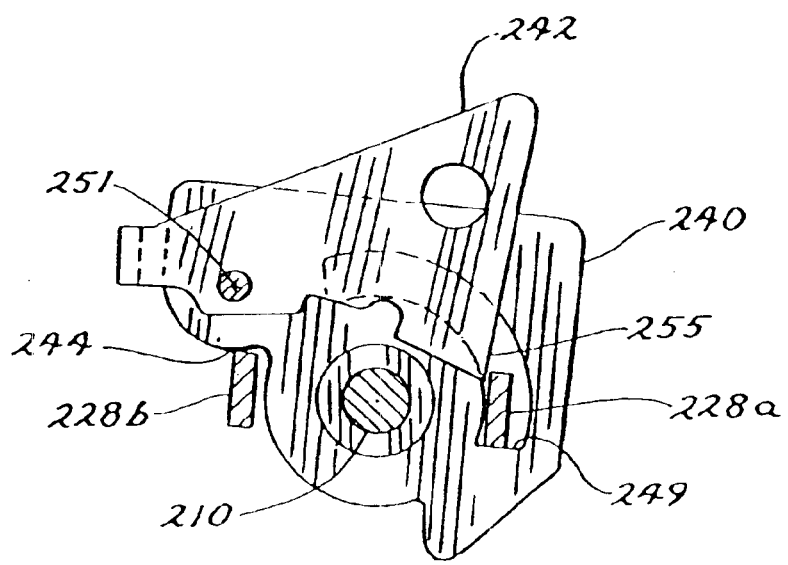
FIG. 10 is a section view taken along line 10—10 of FIG. 3.

During mower operation, the jacking apparatus 200 may be stored as shown in FIG. 3. FIG. 10 illustrates the configuration of the pivot assembly 204 when the jacking apparatus 200 is so stored. As shown in this view, the tab 228b may generally be proximate or in contact with the tab stop 244 while the tab 228a may similarly be in contact with or proximate the tab stop 249. The latching member 242 may be positioned such that the surface 255 contacts the tab 228a as shown. The shape of the latching member 242 and the location of the pivot axis 251 generally prevent rotation of the tab 228a and, thus, rotation of the clevis pin assembly 208. That is, the latching member 242 allows the jacking apparatus 200 to be latched or otherwise retained in its stored position.

To move the mower 100 from the operating configuration to the maintenance configuration, the latching member 242 may be rotated in the direction 256 to the position shown in FIG. 5 whereby the surface 255 no longer contacts the tab 228a. To assist with moving the latching member 242, features, e.g., a finger hole 258, may be provided.

The end 202b of the jacking member 200 may then be lifted out of the cradle 206, e.g., moved in the direction 260 as shown in FIG. 3. For purposes of explanation, motion in the direction 260 is also referred to herein as rotation about an axis 274 (see FIG. 3). To accommodate this relative motion, the jacking member 202 may move relative to the retaining pin 220 within the constraints of the slot 224 (see FIG. 4).

Once the jacking member 202 is raised from the cradle 206, it may be pivoted about the second pivot axis 272, e.g., the axis of the retaining pin 220, for movement generally in the direction 262 as illustrated in FIG. 3. The jacking member 202 may be rotated in the direction 262 until it is approximately parallel with the longitudinal axis 120 (see FIG. 3) of the mower 100, e.g., rotated about 90 degrees. The configuration of the slot 224 may permit some relative translating movement of the member 202 relative to the pivot assembly 204 as the jacking member 202 is moved in the direction 262.

During or after rotation of the jacking member 202 in the direction 262, the member 202 may be pivoted about the axis 253 of the pivot assembly 204 (see FIG. 4), i.e., in the direction 264 as shown in FIG. 5, until the foot 203 contacts the ground surface. As mentioned above, the position of the jacking apparatus 200 as illustrated in FIG. 5 is referred to herein as the jacking position which, as stated above, still corresponds with the vehicle being in the operating configuration. In the jacking position, the jacking member 202 may form a generally first acute angle 263 with the ground surface as shown in FIG. 2A.

Once the jacking member 202 is moved to the jacking position as shown in FIG. 5, the vehicle may be propelled in the direction 116 (see FIG. 2A), preferably under the driving power of the drive wheels 106. As the mower 100 is propelled, the foot 203 preferably remains at a generally fixed location relative to the ground surface. The overall configuration of the jacking apparatus 200, as well as the friction developed between the foot 203 and the ground surface, may assist in preventing forward motion of the foot 203. Moreover, where the ground surface is soft, e.g., turf, the teeth 205 (see FIG. 4) may penetrate or "dig-in" to assist in preventing forward movement of the foot 203.

With the foot 203 in a relatively stationary location with respect to the ground surface, movement of the mower 100 in the forward direction 116 causes the mower 100 to generally ride up and onto the jacking member 202 in a pole-vault-like motion. That is, a first end or portion, e.g., the front, of the mower 100 moves in the direction 118 (see FIG. 2B) relative to a second end or portion, e.g., the rear, as the mower is propelled in the direction 116.

To accommodate the movement of the mower 100 to the maintenance configuration, the mower 100 may pivot about the second end 202b of the jacking member 202, e.g., about the foot 203, as well as about the first end 202a, e.g., about the pivot axis 253 of the pivot assembly 204. In addition, the mower 100 may pivot about a drive wheel axis 107 (see FIGS. 1 and 2B) as it moves towards the maintenance configuration of FIG. 2B.

Figure 9:
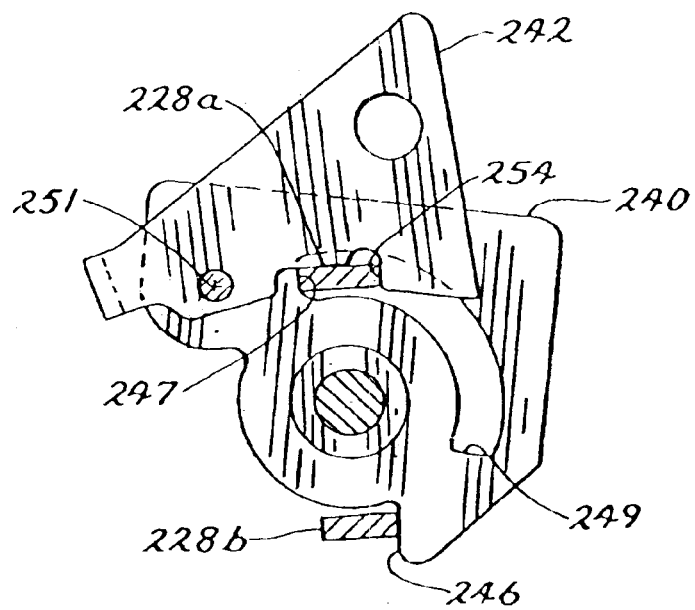
FIG. 9 is a section view taken along line 9—9 of FIG. 8 (for clarity, line 9—9 is also illustrated in FIG. 6)

As the mower 100 moves to the maintenance configuration and the apparatus 200 moves to the jacked position as shown in FIG. 6, tab 228a may move to a position where it either contacts or is in close proximity to tab stop 247 while tab 228b may move to a position where it either contacts or is in close proximity to tab stop 246 as shown in FIG. 9. The particular placement of the tab stops 246 and 247 is selected to form a mechanical stop that prevents the jacking apparatus 200 from overshooting the jacked position. Once the mower 100 reaches the maintenance configuration (see FIG. 2B), i.e., once the jacking apparatus 200 reaches the jacked position, the jacking member 202 forms a second angle 264 with the ground surface, wherein the second angle 264 is greater than the first acute angle 263.

To secure the mower 100 in the maintenance configuration, the latching member 242 may be rotated about the pivot 251 such that the surface 254 engages the tab 228a as shown in FIG. 9. Preferably, the geometry of the latching member 242 is such that the tab 228a is then retained between the tab stop 247 and the surface 254 of the latching member 242. Accordingly, the jacking apparatus 200 may be latched in the jacked position such that movement of the mower 100 in any direction, e.g., forward or backwards, will not result in disengagement of the jacking member 202, i.e., the mower 100 may be locked in the maintenance configuration.

In some embodiments, the geometry of the latching member 242 is such that it may be rotated into position before the mower 100 has actually reached the maintenance configuration. For instance, while the jacking apparatus 200 is in the jacking position of FIG. 5, the latching member 242 may be rotated in a direction opposite the direction 256 until it contacts the tab 228a. Once the jacking apparatus 200 reaches the jacked position, the latching member 242 will fall into the position shown in FIG. 9 under its own weight, locking the jacking apparatus 200 in the jacked position and, correspondingly, the mower 100 in the maintenance configuration.

Figure 8:
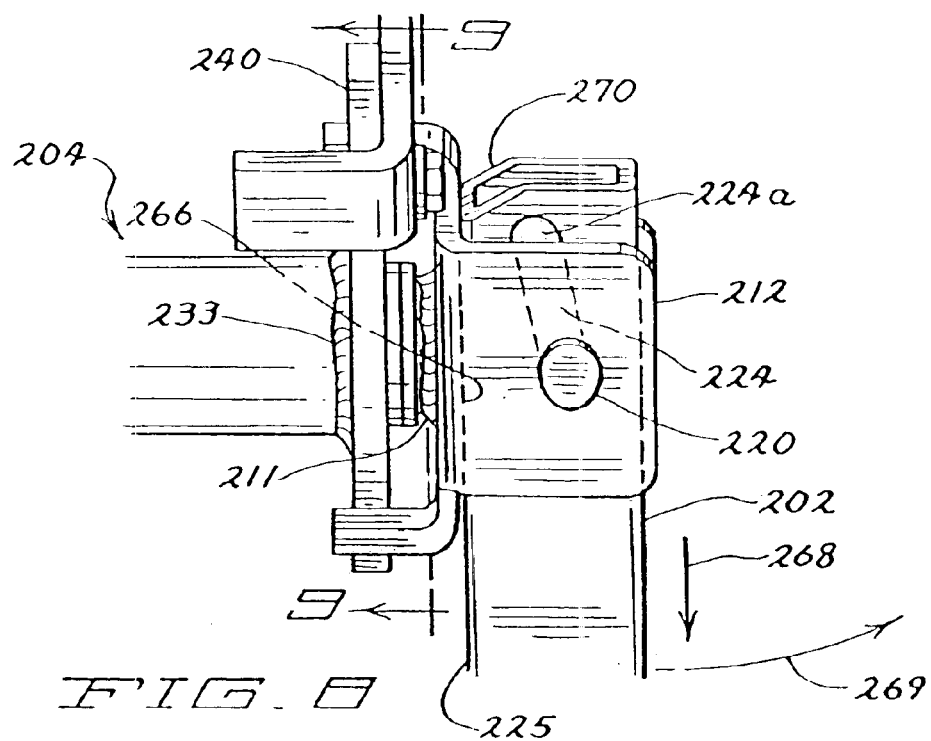
FIG. 8 is an enlarged partial front elevation view of the jacking apparatus of FIG. 6.

To provide lateral rigidity to the jacking apparatus 200 when in the jacked position of FIG. 6, the surface 225 of the jacking member 202 preferably abuts an interior surface 266 of the pivot assembly 204 as illustrated in FIG. 8. When the jacking apparatus 200 is not in the jacked position, or is otherwise not supporting the weight of the mower 100, the jacking member 202 may move relative to the pivot assembly 204 in the direction 268, i.e., the jacking member 202 is free to move within the constraints imposed by the retaining pin 220 within the slot 224. As the jacking member 202 moves in the direction 268, the surface 225 moves away from the surface 266. As a result, once the jacking member 202 is repositioned such that the retaining pin 220 is at or near the first portion 224a of the slot 224, the surface 225 is sufficiently separated from the surface 266 to allow pivoting of the jacking member 202 about the retaining pin 220 in the direction 269 (direction 269 is, relatively speaking, generally equivalent with the direction 262 illustrated in FIG. 3). A corner of the jacking member 202 may include a beveled edge 270 to provide clearance during rotation.

Where the transverse width of the mower 100 is insufficient to accommodate the desired length of the jacking apparatus when in the stored position, a jacking apparatus 300 having a jacking member 302 in accordance with another embodiment of the present invention may be provided as generally shown in FIG. 11. In this embodiment, the jacking member 302 may be a telescoping assembly having at least a first member 302a slidingly received within a second member 302b to provide a jacking member 302 of adjustable length. When the apparatus 300 is in a first or retracted position (shown in solid lines in FIG. 11), the member 302a may be retracted within the member 302b. During operation, the jacking member 302 may be reconfigured to a second or extended position (shown in broken lines in FIG. 11) wherein the first member 302a extends outwardly from the second member 302b, e.g., the jacking member 302 may be reconfigured from a first length to a second length.

To accommodate this adjustable length, the members 302a and 302b may both include one or more apertures 303 (only one shown) which align to permit insertion of one or more fasteners, e.g., a pin 308, which may be secured via any known method, e.g., a cotter pin 309. Accordingly, when the jacking apparatus 300 is in the first position, the pin(s) 308 passes through one or more first apertures in the second member 302b and one or more aligned first apertures in the first member 302a, thus securing the first member 302a relative to the second member 302b in the retracted position. Removal of the pin(s) 308 permits the first member 302a to telescope from the second member 302b to the extended position. To lock the jacking member 302 in the extended position, the pin(s) 308 may be reinserted into the one or more first apertures in the second member 302b which now align with one or more second apertures in the first member 302a.

The jacking apparatus 300 may include a pivot assembly 304 similar in most respects to the pivot assembly 204 already described herein. When in the stored position, a second end of the assembly 302 may be secured within a cradle 306 coupled to the vehicle frame (not shown). The cradle 306 may include a locking device, e.g., pin 310, to secure the jacking member 302 in place.

Once the jacking member 302 is reconfigured, e.g., telescoped, from its first length to its second length, the mower may be reconfigured between the operating configuration (see FIG. 2A) and the maintenance configuration (see FIG. 2B) as generally discussed above with reference to the apparatus 200. That is, the jacking member 302 may be moved from a stored position to a jacking position and then to a jacked position as generally described above.

In still yet another embodiment, a jacking apparatus 400 is provided as shown in FIG. 12. Here, the apparatus 400 is configured to removably attach, e.g., bolt, to the frame rail 102a. While many configurations are possible, in this exemplary embodiment, a beam 401 attaches to the frame rail 102a with clamps 403.

The beam 401 is coupled, e.g., welded, to a pivot assembly 406 which is similar in many respects to the pivot assembly 204 described above. For instance, the pivot assembly 406 may include a sleeve portion 407 for receiving a pin portion 409 of a clevis pin assembly 411. The clevis pin assembly 411 may also include a clevis portion 413 for receiving a jacking member 402. The clevis pin assembly 411 may further include a flange portion 415 which is shown as welded to the clevis portion 413.

The clevis pin assembly 411 of the pivot assembly 406 may also include a retaining pin 408 which passes through the jacking member 402 and permits the latter to pivot thereabout. As with the jacking apparatus 200, the retaining pin 408 may pass through a slot (not shown) formed in the end of the jacking member 402.

A lock pin 410 may be used to lock the jacking member 402 relative to the clevis pin assembly 411. By removing the lock pin 410, the jacking member 402 may be rotated about the pin 408 in the direction 420 to place the apparatus 400 in a stored position (not shown) in which the jacking member 402 extends generally transverse to the mower (similar to the jacking apparatus 200 described above). The lock pin 410 may then be reinserted to hold the jacking member 402 in the stored position.

To move the jacking member 402 to a jacking position (not shown), the lock pin 410 may be removed and the jacking member 402 pivoted in a direction opposite to the direction 420, after which the lock pin 410 may be reinserted. Once the jacking member 402 is locked in place with the lock pin 410, the jacking member 402 (and clevis pin assembly 411) may be pivoted about an axis 416 of the sleeve portion 407 to a jacking position, much like the jacking apparatus 200 described above.

Propulsion of the mower in a first direction then causes the mower to ride up and onto the jacking member 402 to its maintenance configuration which corresponds to a jacked position of the apparatus 400 (as shown). A spring-loaded pin 412 may be used to lock the clevis pin assembly 411 of the pivot assembly 406, and thus the jacking member 402, in the jacked position by extending through a hole 414 in the flange portion 415 as shown. The flange portion 415 may also include other holes (not shown) to permit locking of the pivot assembly 406, and thus the jacking member 402, in additional positions. The pin 412 may be withdrawn from the hole 414 by manipulation of a spring handle 412a.

Figure 13:
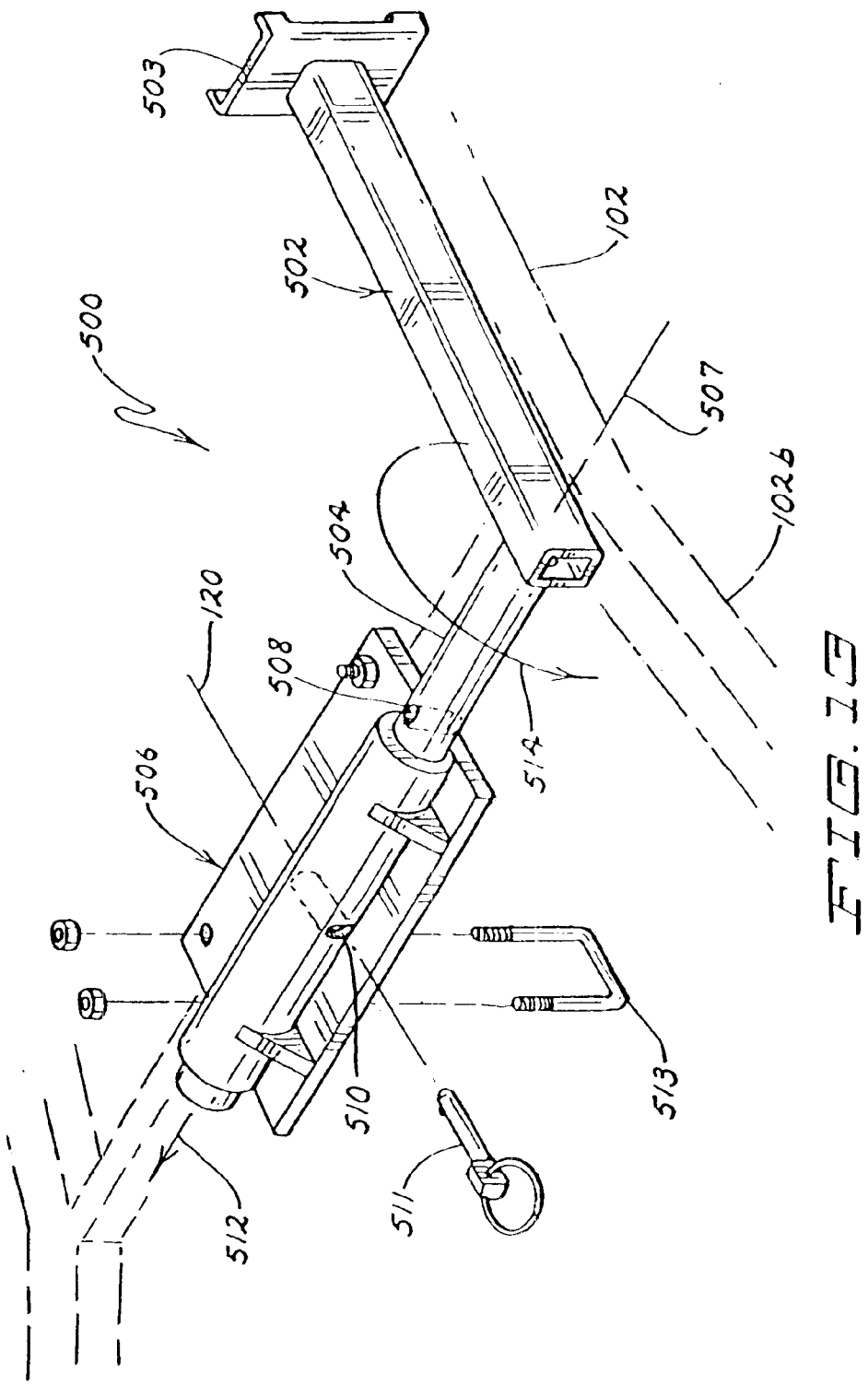
FIG. 13 is a perspective view of a jacking apparatus in accordance with still yet another embodiment of the present invention.

FIG. 13 illustrates yet another embodiment of a jacking apparatus 500 adapted to install on a lawn mowing vehicle (not shown). In this particular embodiment, the apparatus 500 includes a jacking member 502 having an attached (e.g., welded) slide portion 504 extending therefrom to form a generally L-shaped member. The apparatus 500 may further include a slide bearing assembly 506 adapted to receive the slide portion 504 of the jacking member 502. The slide bearing assembly 506 may be attached, e.g., welded or fastened (as shown with U-shaped clamps 513), to the mower frame 102. The slide bearing assembly 506 may define an axis 507 generally perpendicular and transverse to the longitudinal axis 120 of the mower.

During mower operation, the jacking apparatus 500 may be placed in a stored position (as shown in FIG. 13) where it extends rearwardly and generally parallel to the longitudinal axis 120 of the mower. For convenience, the apparatus 500 may permit storing the jacking member 502 at an outboard position as illustrated. A locking pin 511, which may pass through an aperture 510 in the slide bearing assembly 506 and through a corresponding aperture (not shown) in the slide portion 504, may secure the jacking apparatus 500 in the stored position.

To move the mower 100 to the maintenance configuration (see FIG. 2B), the jacking member 502 may be moved along the axis 507 (after removing the locking pin 511) in the direction indicated by arrow 512 to a more central location, e.g., a location proximate the longitudinal axis 120 of the mower. Once the jacking member 502 is so located, it may be rotated about the axis 507 to a jacking position (generally similar to the position of the jacking member of the jacking apparatus 200 in FIG. 2A), e.g., rotated in the direction indicated by arrow 514 until a foot 503 of the jacking member 502 contacts the ground surface. At this point, the mower may be propelled so that it rides up and onto the jacking member 502 as generally described with respect to the embodiments of FIGS. 1–10. Once the mower reaches the maintenance configuration, the jacking apparatus 500 is in a jacked position (generally similar to the position of the jacking apparatus 200 in FIG. 2B). The pin 511 may then be re-inserted into the aperture 510, now in alignment with an aperture 508 in the slide portion 504. As a result, the jacking apparatus 500 may be locked in the jacked position (and thus the mower in the maintenance configuration).

Advantageously, jacking apparatus of the present invention provide on-board jacking capability for mowers and the like which may be actuated by the propelling power of the mower itself. Further, embodiments of the jacking apparatus permit pivoting of the jacking member about a first pivot axis generally transverse to the longitudinal axis of the mower, e.g., about the axis 253 (FIG. 4), and optionally about a second pivot axis, e.g., about the axis 272 (FIG. 3), which may be substantially perpendicular to the first pivot axis. This multi-axis movement allows for convenient, transverse storage of the jacking apparatus when not in use. Moreover, by providing multi-axis movement, the jacking apparatus may be advantageously located on the mower frame so as not to interfere with mower operation nor extend beyond the general envelope of the mower itself when stored.

Other embodiments may not incorporate the second pivot axis but may permit lateral movement of the jacking member, e.g., along the axis 507 as shown in FIG. 13. As a result, the jacking member may be storable without multi-axis pivoting.

Exemplary embodiments of the present invention are described above. Those skilled in the art will recognize that many embodiments are possible within the scope of the invention. For instance, the jacking apparatus could be attached at a different point on the mower, e.g., the rear. In such a configuration, movement of the mower in a rearward direction may elevate the rear portion of the mower. Other variations, modifications, and combinations of the various parts and assemblies can certainly be made and still fall within the scope of the invention. Thus, the invention is limited only by the following claims, and equivalents thereto.

What is claimed is:

1. An on-board jacking apparatus for use with a self-propelled vehicle, the apparatus comprising:
   a pivot assembly adapted to couple to the vehicle, the pivot assembly comprising a first pivot having a first pivot axis;
   a jacking member having a first end and a second end, the first end adapted to couple to the pivot assembly for pivoting of the jacking member about the first pivot axis, wherein the jacking member is movable between at least a stored position corresponding to an operating configuration of the vehicle, and a jacked position corresponding to an elevated maintenance configuration of the vehicle; and
   a second pivot associated with the pivot assembly, the second pivot having a second pivot axis proximate the first end of the jacking member, wherein the second pivot axis is substantially perpendicular to the first pivot axis.

2. The jacking apparatus of claim 1, further comprising a latching member operable to selectively latch the jacking member in one or both of the jacked position and the stored position.

3. The jacking apparatus of claim 1, wherein the jacking member is movable from the stored position to a jacking position by pivoting about at least the second pivot axis.

4. The jacking apparatus of claim 1, wherein the pivot assembly is adapted to couple to a frame of the vehicle such that the first pivot axis is generally transverse to a longitudinal axis of the vehicle.

5. The jacking apparatus of claim 2, wherein the latching member is coupled to the pivot assembly.

6. The jacking apparatus of claim 1, further comprising a clevis pin assembly having a pin portion adapted to couple with the pivot assembly and a clevis portion adapted to couple with the first end of the jacking member.

7. The jacking apparatus of claim 6, further comprising a retaining pin for attaching the clevis portion to the jacking member, the retaining pin defining the second pivot axis.

8. The jacking apparatus of claim 7, wherein the first end of the jacking member comprises a slot adapted to receive the retaining pin.

9. The jacking apparatus of claim 8, wherein the slot forms an angle relative to a longitudinal axis of the jacking member.

10. The jacking apparatus of claim 1, wherein the second end of the jacking member is storable in a cradle when the jacking member is in the stored position.

11. An on-board jacking apparatus for use with a self-propelled vehicle, the apparatus comprising:
   a pivot assembly operable to couple to the vehicle, the pivot assembly comprising a first pivot having a first pivot axis;
   a second pivot proximate the pivot assembly and comprising a second pivot axis substantially normal to the first pivot axis; and
   a jacking member having a first end and a second end, the first end operatively coupled to the pivot assembly such that the jacking member may pivot about the first pivot axis and the second pivot axis.

12. The jacking apparatus of claim 11, wherein the jacking member is movable between at least a stored position corresponding to an operating configuration of the vehicle, and a jacked position corresponding to an elevated maintenance configuration of the vehicle.

13. The jacking apparatus of claim 12, further comprising a latching member operable to selectively latch the jacking member in one or both of the jacked position and the stored position.

14. An on-board jacking apparatus for use with a self-propelled vehicle, the apparatus comprising:
   a jacking member operable to selectively support at least one portion of the vehicle in an elevated maintenance configuration; and
   a pivot assembly operable to couple the jacking member to the vehicle, wherein the pivot assembly allows the jacking member to pivot about at least two nonparallel axes.

15. The jacking apparatus of claim 14, wherein the at least two nonparallel axes comprise a first pivot axis and a second pivot axis, the second pivot axis substantially orthogonal to the first pivot axis.

16. The jacking apparatus of claim 14, wherein a first pivot axis of the at least two nonparallel axes is generally transverse to a longitudinal axis of the vehicle.

17. An on-board jacking apparatus for use with a self-propelled vehicle, the apparatus comprising:
   a pivot assembly adapted to couple to the vehicle, the pivot assembly comprising a first pivot having a first pivot axis;
   a jacking member having a first end and a second end, the first end adapted to couple to the pivot assembly for pivoting of the jacking member about the first pivot axis, wherein the jacking member further comprises two or more sections assembled in a telescoping relationship; and
   a second pivot associated with the pivot assembly, the second pivot having a second pivot axis proximate the first end of the jacking member, wherein the second pivot axis is substantially perpendicular to the first pivot axis.

18. An on-board jacking apparatus for use with a self-propelled vehicle, the apparatus comprising:
   a pivot assembly operable to couple to the vehicle, the pivot assembly comprising a first pivot having a first pivot axis;
   a second pivot associated with the pivot assembly and comprising a second pivot axis substantially normal to the first pivot axis; and
   a jacking member having a first end and a second end, the first end operatively coupled to the pivot assembly such that the jacking member may pivot about the first pivot axis and the second pivot axis, wherein the jacking member further comprises two or more sections coupled in a telescoping relationship.

* * * * *